US008695905B1

(12) United States Patent
Pagan et al.

(10) Patent No.: US 8,695,905 B1
(45) Date of Patent: Apr. 15, 2014

(54) PASTELES MAKER

(76) Inventors: Gervasio Pagan, Tampa, FL (US);
Roxanne Pagan, Tampa, FL (US)

(*) Notice: Subject to any disclaimer, the term of this patent is extended or adjusted under 35 U.S.C. 154(b) by 178 days.

(21) Appl. No.: 13/078,604

(22) Filed: Apr. 1, 2011

Related U.S. Application Data

(63) Continuation of application No. 12/284,238, filed on Sep. 19, 2008, now abandoned.

(51) Int. Cl.
*A01F 21/00* (2006.01)
*B23Q 11/00* (2006.01)

(52) U.S. Cl.
USPC ....... 241/37.5; 241/92; 241/282.1; 241/282.2

(58) Field of Classification Search
USPC .............................. 241/92, 282.1, 282.2, 37.5
See application file for complete search history.

(56) References Cited

U.S. PATENT DOCUMENTS

| 3,032,087 | A | * | 5/1962 | Rodwick | 241/92 |
| 3,809,325 | A | * | 5/1974 | Marrie | 241/278.1 |
| 4,095,751 | A | * | 6/1978 | Artin | 241/37.5 |
| 5,364,037 | A | | 11/1994 | Bigelow | |
| 5,967,434 | A | | 10/1999 | Virk | |
| D493,074 | S | | 7/2004 | Brousseau et al. | |
| 6,766,972 | B1 | | 7/2004 | Prommel et al. | |
| D494,074 | S | | 8/2004 | Ishii | |

* cited by examiner

*Primary Examiner* — Bena Miller
(74) *Attorney, Agent, or Firm* — Robert C. Montgomery; Montgomery Patent & Design

(57) ABSTRACT

An electrically-powered food processor apparatus with special features to aid in the processing of foodstuffs, particularly for Latin American recipes comprises a central hopper with a large open top. A top mounted central crank turns a blade disc located on the bottom inside surface of the hopper. The cutting design of the blade disc is such that the foodstuffs that are cut are the ideal size for use in recipes such as pasteles and alcapurrias. The blade disc can be interchangeable for other blade discs that allow for thinner foodstuffs, thicker foodstuffs, or special serrated designs.

20 Claims, 5 Drawing Sheets

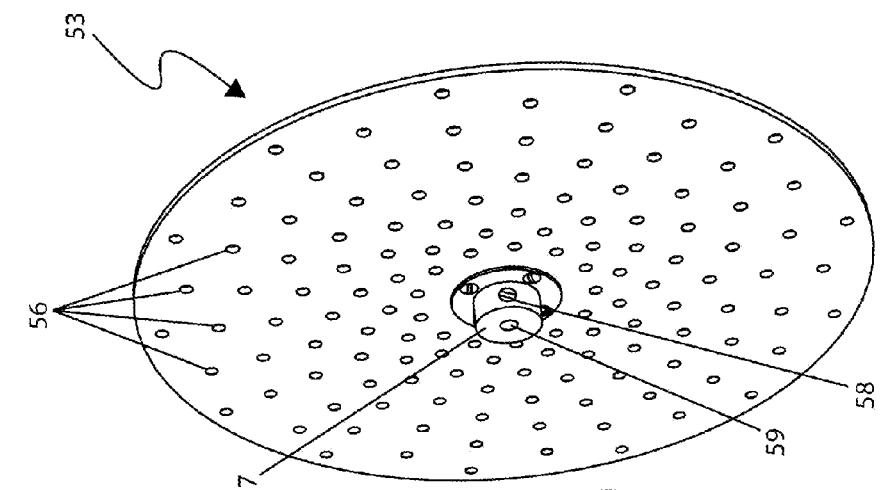
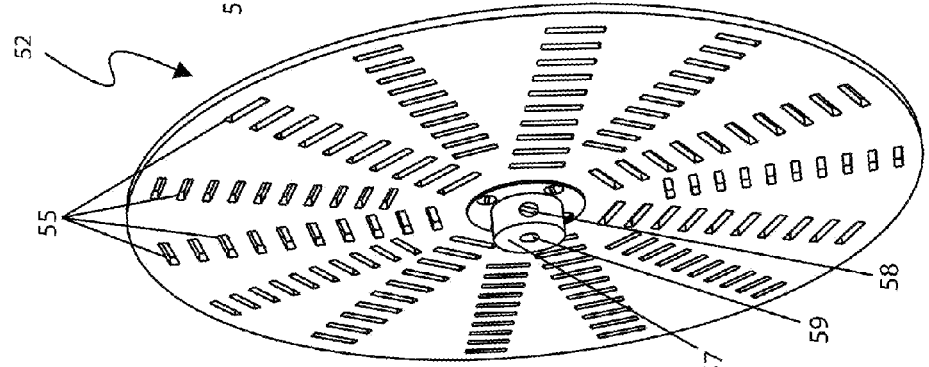
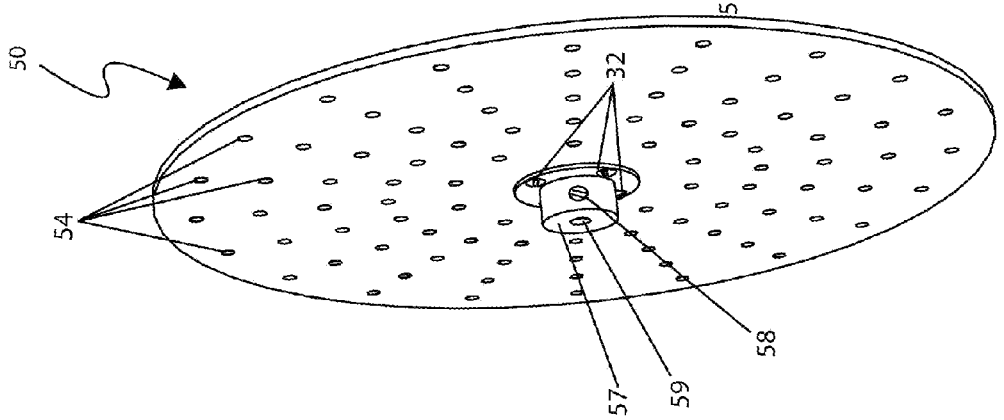
Fig. 4c
Fig. 4b
Fig. 4a

PASTELES MAKER

RELATED APPLICATIONS

The present invention is a Continuation of and claims the benefit of U.S. application Ser. No. 12/284,238, filed Sep. 19, 2008 now abandoned the entire disclosures of which are incorporated herein by reference.

FIELD OF THE INVENTION

The present invention provides a means for processing foodstuffs into a grated and puree form through the use of a downward motion thereupon a pressing lid, thereby forcing subjacent foodstuffs through a rotating grating disc having a plurality of perforations and through a spout thereby directing processed foodstuffs thereto a receiving container and, more particularly, to processing foodstuffs commonly associated with pasteles or other similar Latin American cuisine.

BACKGROUND OF THE INVENTION

Cooks, chefs and others who prepare food are familiar with the time and effort it takes to cut, grate, or mince vegetables, cheeses and other foods. While recently introduced products, such as food processors take some of the drudgery out of this work by providing an electrically operated appliance with spinning blades, they all suffer from a similar disadvantage. Namely, the integral container that holds the grated food is not large enough. While it may be adequate for foods that are used in small quantities such as nuts, it does not work well with food such as onions, tomatoes, peppers, celery, and other foods which are needed in large quantities to prepare certain dishes such as pasteles. Additionally, many food processors improperly cut certain foods, and the user ends up with ingredients that are either too large or too small in size. Accordingly, there exists a need for a means by which the cutting and grating of various food ingredients can be processed without the disadvantages as listed above. The development of the invention described herein fulfills this need.

In preparation of some Latin American cuisine dishes, the cutting and mincing of the necessary ingredients takes time and significant effort. Those who prepare such dishes often find conventional electrical food processors inadequate as they may have containers which are too small in volume and improperly cut ingredients leading to ingredients that are either too large or too small in size for the desired recipe. Accordingly, there exists a need for the cutting and grating of various food ingredients in the desired volume, especially for Latin American cuisine and similar recipes. The development of a food preparation apparatus particularly suited for these types of recipes fulfills this need.

Pasteles are a traditional dish of Latin America similar to a tamale and resembling a pastry. To make the dough, many different types of flour are used. Frequently, those making the flour resort to handheld graters to grate the banana, green plantain, taro root, pumpkin, or other foodstuffs. This is extremely labor intensive and time consuming, particularly, if one is preparing a large quantity of pastels for a holiday feast. The invention described herein resolves these problems in preparing pasteles.

There have been attempts in the past to develop machines to prepare foodstuffs for cooking. U.S. Pat. No. D 493,074 issued to Brousseau et al discloses what appears to be a hand held rotary grater. Unfortunately, this design patent does not appear to disclose an apparatus similar to the disclosed invention nor does it appear to comprise a large central hopper with a blade system located at the bottom inside surface of the hopper.

U.S. Pat. No. 6,766,972 issued to Prommel et al discloses a rotary hand grater with a grating drum. Unfortunately, this patent does not appear to disclose an electrically-powered food processing apparatus that comprises a plurality of interchangeable discs to prepare foodstuffs for cooking or consumption.

U.S. Pat. No. 5,967,434 issued to Virk discloses an apparatus for grating cheese and other foodstuffs comprising a container upon which the foodstuff to be prepared is mounted. A spring maintains the foodstuff against a grating disc that is manually turned. Unfortunately, this patent does not appear to disclose an apparatus that comprises a large hopper with an electrically activated crank that activates one (1) of a plurality of interchangeable cutting discs.

U.S. Pat. No. 5,364,037 issued to Bigelow discloses an electric cheese grater with spring-loaded cheese compartment that is hand held. Unfortunately, this patent does not appear to disclose a large electrically powered food processing apparatus that comprises a large hopper with a crank operated blade disc to prepare food for cooking or consumption.

At www.elcomadito.com, a pasteles and alcapurrias maker is offered for sale that appears to be a large flat hopper that is connected to a chute containing a blade system that prepares the foodstuffs which then pass into a container. Unfortunately, this disclosed apparatus does not appear to operate in a similar manner as the disclosed invention nor does it appear to comprises a plurality of interchangeable cutting discs.

An additional disclosed pasteles apparatus is located at www.elcomadito.com on the internet and appears to be an electrically operated pastels maker with an industrial motor. Unfortunately, this disclosed apparatus does not appear to comprise a plurality of interchangeable cutting disks nor does it appear to comprise a clear plastic chamber.

Another pasteles maker is found at www.elcomadito.com and appears to comprise a large vat that is mounted over a cutting mechanism. Unfortunately, this apparatus does not appear to comprise a hopper with a crank mechanism to operate a plurality of interchangeable blades to prepare foodstuffs for cooking or consumption.

None of the prior art particularly describes an electrically-powered food processing apparatus. Consequently, there is a need for such an apparatus comprising a large central hopper with a blade system utilizing a plurality of interchangeable cutting discs located at the bottom inside surface of the hopper.

SUMMARY OF THE INVENTION

In light of the disadvantages inherent in the prior art, it is apparent that there is a need for an apparatus and method for food preparation that provides a motorized food processor comprising a large hopper having an assortment of specially designed grating discs being rotated by a powerful motor to process foodstuffs on a large scale.

An object of the food preparation apparatus is to provide a motorized food processor comprising a large hopper having an assortment of specially designed grating discs that are rotated by a powerful motor to process foodstuffs on a large scale.

Another object of the food preparation apparatus provides a processed food opening that providing automatic removal of processed foodstuffs.

A further object of the food preparation apparatus is a hopper made of a transparent plastic material.

Yet still a further object of the food preparation apparatus provides a manual pressing device that is utilized to force foodstuffs against and through grating discs to produce a fine puree ideal for use in traditional Latin American dishes.

Still another object of the food preparation apparatus is a set of three (3) or more interchangeable grating discs comprising additional perforated grating patterns, thereby producing processed foodstuffs with a variety of different textures.

Still a further object of the food preparation apparatus is a base unit with foot pads to absorb vibration, reduce noise, and stabilize the apparatus.

Yet another object of the food preparation apparatus is a spout to direct ground processed foodstuffs into a container or other receiving vessel.

Still another object of the food preparation apparatus is that power is supplied to the apparatus by conventional 110-volt power cord which would be inserted in a normal household electrical outlet.

An aspect of the food preparation apparatus comprises a base unit, a hopper, a clamping ring, a first grating disc, a motor, and a pressing disc.

Another aspect of the food preparation apparatus comprises a base unit further comprising a generally rectangular shaped plastic housing comprising three (3) vertical side panels, a vertical front panel, a top panel, a bottom panel, and four (4) stabilizing foot pads providing a stabilizing means thereto the apparatus extending horizontally outward from a bottom portion of the hopper in all directions.

A further aspect of the food preparation apparatus comprises footpads that are common cylinder-shaped rubber devices designed to provide a firm lateral grip thereto a table or counter surface located in each of the four (4) corners of the bottom panel portion of the base unit.

Another aspect of the food preparation apparatus comprises a hopper further comprising a cylindrical container having features such as vertical side walls, a pair of opposing "U"-shaped handles, a reinforced circular upper rim, and an open top portion mounted stationaryarily to and supported by a base unit using common fasteners.

A further aspect of the food preparation apparatus is a first grating disc located along an interior bottom surface of the hopper attached to the apparatus by a center clamping ring which in-turn attaches to a subjacent motor. The first grating disc comprises a circular stainless steel plate providing a cutting and grinding means to foodstuffs.

Still another aspect of the food preparation apparatus comprises a base unit with a front panel portion comprising a spout and a recessed ON/OFF button switch. The spout comprises a wide high-volume design comprising a three-sided chute being indented into the top and front surfaces of the base unit at a downward angle. The spout is envisioned being made using polished heavy-gauge stainless sheet steel. The spout further comprises a pair of integral spout side walls being formed vertically upwardly at right angles providing an attachment means of the spout to the top panel portion of the base unit. A distal portion of the spout extends from beneath the processed food opening portion of the hopper and extending toward a user at a proximal end.

Yet still another aspect of the food preparation apparatus comprises a motor comprising a standard cylindrical bodied unit mounted in the base unit. Said motor further comprises a 110-volt AC unit comprising an integral circular mounting plate providing a secure attachment means to the bottom panel portion of the base unit and designed to produce a desired torque and number of output revolutions to properly grind the foodstuffs.

Yet still another aspect of the food preparation apparatus comprises a motor comprising a single output drive shaft extending into the hopper and providing an attachment means to the clamping ring portion of the first grating disc.

A further aspect of the food preparation apparatus comprises a pressing disc comprising a clear plastic circular plate and a common knob at a central location allowing a user to manually apply a pressing motion to foodstuffs loaded into the hopper, comprising a specific diameter so as to slidingly fit into a top opening portion of the hopper.

Still another aspect of the food preparation apparatus comprises a processed food opening comprising a circular segment of a bottom portion of the hopper thereby directing a sufficient flow of processed foodstuffs from the hopper, down the spout, and into a receiving container.

Yet still another aspect of the food preparation apparatus comprises three (3) or more grating discs comprising a first grating disc, a second grating disc, and a third grating disc with a plurality of first perforations, second perforations, and third perforations, respectively. Each grating disc comprises different shaped, sized, and arranged perforations along a surface area thereof, to produce processed foodstuffs with a variety of different textures.

Still another aspect of the food preparation apparatus comprises grating discs comprising a centrally located clamping ring with a cylindrical stainless steel machined part attached by a flanged base and common fasteners. The clamping ring securely attaches the grating discs to the drive shaft using a common set screw.

Still a further aspect of the food preparation apparatus comprises grating discs with perforations. Said perforations comprise various openings having differing shapes such as circular, oval, slotted, square, and the like, providing sharp stamped edges suitable for cutting and grinding foodstuffs having different textures.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4*a* is a perspective view of a first grating disc portion 50 of the pasteles maker 10, according to a preferred embodiment of the present invention;

FIG. 4*b* is a perspective view of a second grating disc portion 52 of the pasteles maker 10, according to a preferred embodiment of the present invention;

FIG. 4*c* is a perspective view of a third grating disc portion 53 of the pasteles maker 10, according to a preferred embodiment of the present invention; and, FIG. 5 is an electrical block diagram of a pasteles maker 10, according to a preferred embodiment of the present invention.

DESCRIPTIVE KEY

| | |
|---|---|
| 10 | pasteles maker |
| 20 | base unit |
| 21 | spout |
| 22 | ON/OFF button switch |
| 23 | spout well |
| 24 | foot pads |
| 25 | spout side wall |
| 26 | bottom panel |
| 27 | top panel |
| 28 | side panel |
| 29 | front panel |
| 30 | hopper |
| 31 | processed food opening |
| 32 | fastener |
| 33 | handle |
| 34 | rim |
| 35 | mounting ear |
| 40 | pressing disc |
| 41 | knob |
| 50 | first grating disc |
| 52 | second grating disc |
| 53 | third grating disc |
| 54 | first perforation |
| 55 | second perforation |
| 56 | third perforation |
| 57 | clamping ring |
| 58 | set screw |
| 59 | aperture |
| 60 | motor |
| 61 | drive shaft |
| 62 | alternating current (AC) power cord |
| 63 | mounting plate |
| 64 | internal wiring |
| 80 | user |
| 81 | foodstuffs |
| 82 | pressing motion |
| 83 | processed foodstuffs |
| 90 | container |

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a pasteles maker (herein described as the "apparatus") 10, which provides a motorized food processor comprising a large hopper 30 having an assortment of specially designed grating discs being rotated by a powerful motor 60 to process foodstuffs 81 on a large scale. A manual pressing device 40 is utilized to force said foodstuffs 81 against and through said grating discs to produce a fine puree ideal for use in traditional Latin American dishes.

Figure 1:
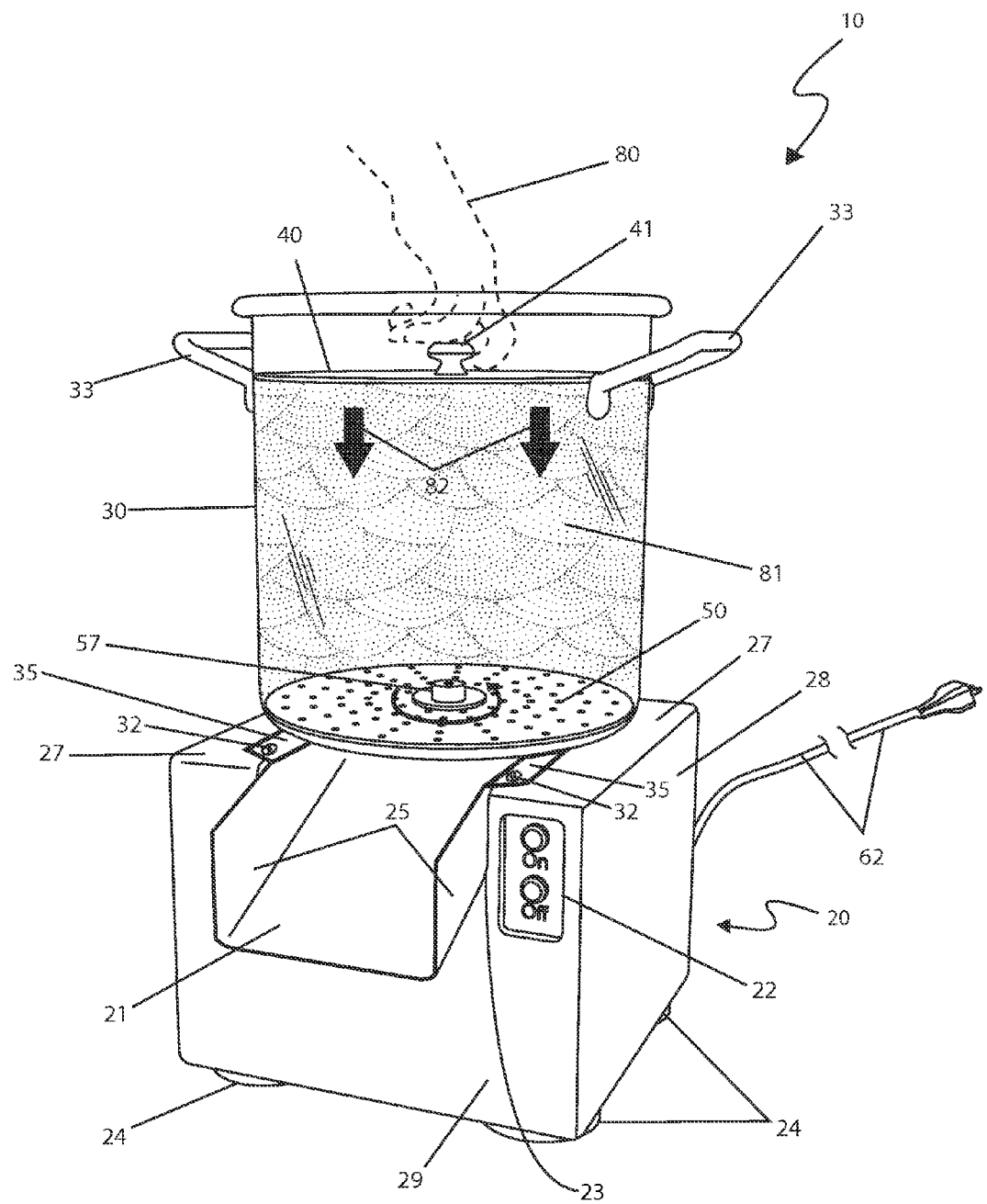
FIG. 1 is a front perspective view of a pasteles maker 10, according to a preferred embodiment of the present invention.

Referring now to FIG. 1, a front view of the apparatus 10, according to the preferred embodiment of the present invention, is disclosed. The apparatus 10 comprises a base unit 20, a hopper 30, a clamping ring 57, and a first grating disc 50. The apparatus 10 comprises rugged construction using food-grade plastic and metal portions being suitable thereto residential or commercial use. The hopper 30 comprises a cylindrical container similar to a large cooking pot having expected standard features such as vertical side walls, a pair of opposing "U"-shaped handles 33, a reinforced circular upper rim 34, and an open top portion. The hopper 30 is envisioned to be made of a transparent plastic material such as Lexan™, acrylic, Plexiglas™, or the like to provide an easy means for washing and cleaning after use. Located inside of, and along a bottom surface thereof said hopper 30 is a first grating disc 50 being attached thereto the apparatus 10 via a center clamping ring 57 which in-turn attaches thereto a subjacent motor 60 (see FIG. 2). The first grating disc 50 comprises a circular stainless steel plate providing a cutting and grinding means to foodstuffs 81. The apparatus 10 comprises a set of three (3) or more such grating discs comprising additional perforated grating patterns, thereby producing foodstuffs 81 having a variety of different textures (see FIGS. 4a-4c). The hopper 30 is mounted stationary thereto and supported thereby a base unit 20 using common fasteners 32. The base unit 20 provides a generally rectangular shaped plastic housing comprising three (3) vertical side panels 28, a vertical front panel 29, a top panel 27, a bottom panel 26, and four (4) stabilizing foot pads 24. The base unit 20 is envisioned to be made preferably using strong plastic panels using plastic materials such as, but not limited to: polypropylene, acrylonitrile butadiene styrene (ABS), or the like; however, said base unit 20 may be produced and provided in a stainless steel material often required by commercial applications and as such should not be considered a limiting factor of the invention 10. The base unit 20 may be manufactured as a single-piece plastic injection molded or cast enclosure or as an assembly of individual panels attached using common fasteners 32. The base unit 20 provides a stabilizing means thereto the apparatus 10 extending horizontally outward therefrom a bottom portion of the hopper 30 in all directions. The foot pads 24 comprise common cylinder-shaped rubber devices designed to provide a firm lateral grip thereto a table or counter surface, absorb vibration, reduce noise, and stabilize the apparatus 10. The foot pads 24 are located in each of the four (4) corners of the bottom panel portion 26 of the base unit 20 being affixed thereto using fasteners 32 such as threaded studs, screws, or the like. The front panel portion 29 of the base unit 20 further comprises a spout 21 and a recessed ON/OFF button switch 22. The spout 21 comprises a wide high-volume design comprising a three (3) sided chute being indented thereinto the top 27 and front 29 surfaces of the base unit 20 within a spout well 23 at a downward angle to direct ground foodstuffs 81 thereinto a container 90 or other receiving vessel. The spout 21 is envisioned being made using polished heavy-gauge stainless sheet steel. The spout 21 comprises a front opening approximately five (5) to seven (7) inches wide being located at a central position along the front panel 29. The spout 21 further comprises a pair of integral spout side walls 25 being formed vertically upwardly at right angles therefrom. Said spout side walls 25 provide an attachment means of the spout 21 thereto the top panel portion 27 of the base unit 20 via a pair of integrally formed ears 35 extending horizontally outward and being affixed thereto said top panel 27 using common fasteners 32. A distal end portion of the spout 21 extends therefrom beneath the processed food opening portion 31 of the hopper 30, (see FIG. 3), sloping downwardly at approximately thirty degrees (30°) and extending toward a user 80 at a proximal end. The ON/OFF button switch 22 provides a common open and closed electrical contact functions shown here in a common dual-push-button configuration having a pair of recessed mechanical toggling buttons; however, it is understood that other standard switches providing like functionality may be provided with equal benefit.

Figure 2:
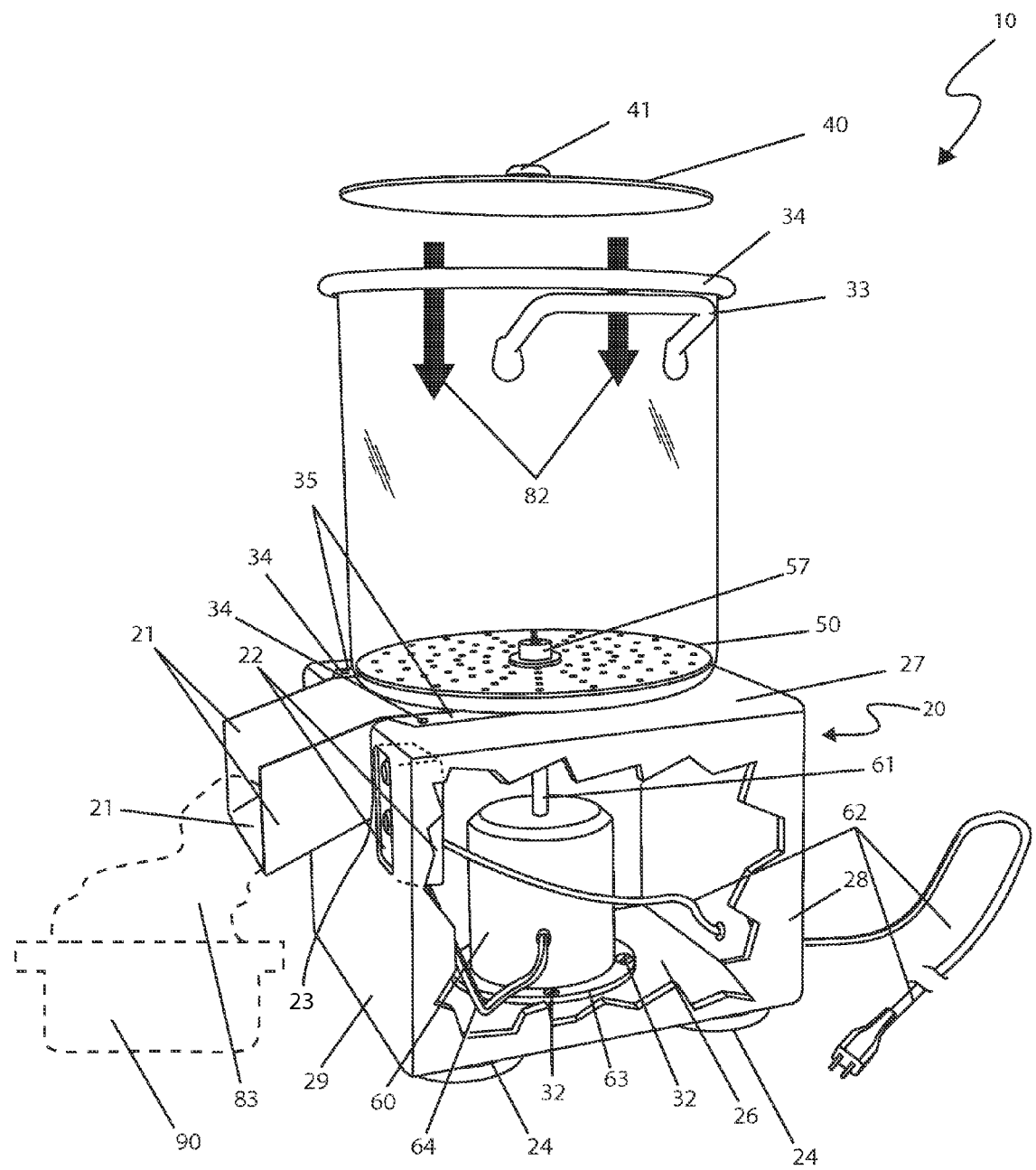
FIG. 2 is a side cut-away view of a pasteles maker 10, according to a preferred embodiment of the present invention.

Referring now to FIG. 2, a side cut-away view of the apparatus 10, according to the preferred embodiment of the present invention, is disclosed. The apparatus 10 comprises a motor 60, and a pressing disc 40. The motor 60 comprises a standard cylindrical bodied unit mounted in a vertical configuration thereat a central location along the bottom panel 26 portion of the base unit 20. Said motor 60 further comprises a 110-volt AC unit comprising an integral circular mounting plate 63 along a bottom end portion of said motor 60 and extending outwardly therefrom, thereby providing a secure attachment means thereto the bottom panel portion 26 of the base unit 20 via common fasteners 32 such as screws, bolts, or the like. The motor 60 also provides a single output drive shaft 61 extending therefrom a top portion extending upwardly thereinto the hopper 30 providing an attachment means thereto the aforementioned clamping ring portion 57 of the first grating disc 50 via a common set screw 56 (see FIG. 4a). The motor 60 comprises an approximate one-half (½) horsepower rating and comprises a standard gear-type motor unit having expected internal gear reduction components designed to produce a desired torque and number of output revolutions to properly grind the foodstuffs 81. The pressing disc 40 comprises a clear plastic circular plate and a common knob 34 thereat a central location allowing a user 80 to manually apply a downward force, thereby producing a pressing motion 82 thereto subjacent foodstuffs 81 loaded into the hopper 30. The pressing disc 40 comprises a specific diameter so as to slidingly fit thereinto a top opening portion of the hopper 30, thereby directing said foodstuffs 61 downwardly therethrough the first grating disc 50. The pressing disc 40 is envisioned to be made using similar material as the hopper 30 and being approximately one-quarter (¼) of an inch thick.

Figure 3:
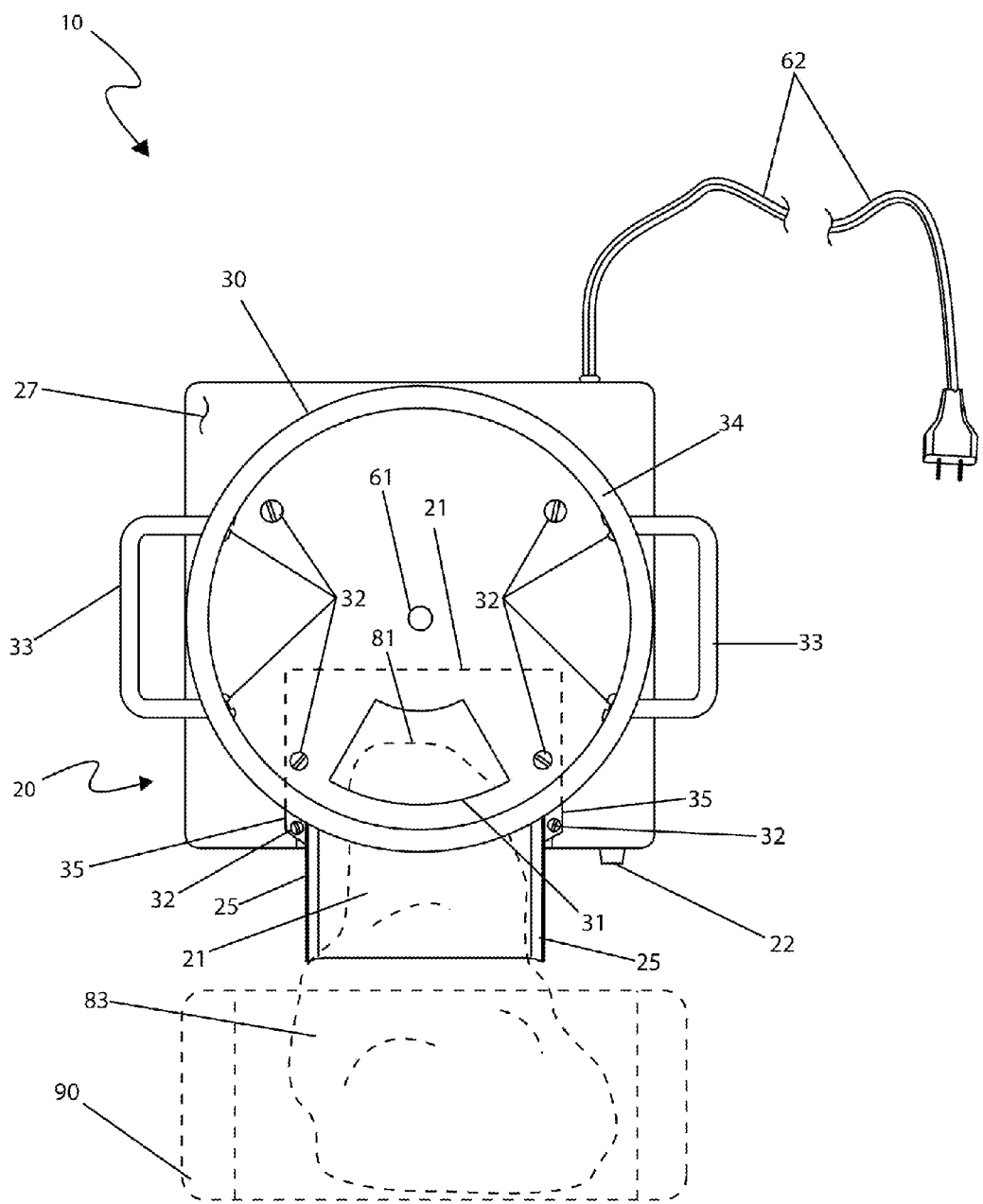
FIG. 3 is a top view of a pasteles maker 10, according to a preferred embodiment of the present invention.

Referring now to FIG. 3, a top view of a pasteles maker 10, according to a preferred embodiment of the present invention, is disclosed. The apparatus 10 is shown here having the first grating disc 50 removed for illustration sake. The apparatus 10 comprises a processed food opening 31 providing automatic removal of processed foodstuffs 83. The processed food opening 31 is located along a bottom surface of the hopper 30 providing a removal means thereto processed foodstuffs 83 directing said foodstuffs 83 therefrom the hopper 30, down the spout 21, and into a receiving container 90. Said processed food opening 31 is located at a superjacent position with respect thereto the aforementioned spout 21 and comprises a cut opening thereinto a forward bottom surface of the hopper 30. The processed food opening 31 comprises a circular segment of a bottom portion of the hopper 30 having a width of approximately four (4) inches, thereby enabling a sufficient flow of processed foodstuffs 83 therefrom the apparatus 10.

Referring now to FIGS. 4a through 4c, perspective views of grating disc portions of the pasteles maker 10, according to a preferred embodiment of the present invention, are disclosed. The apparatus 10 is provided preferably therewith three (3) or more grating discs comprising a first grating disc 50, a second grating disc 52, and a third grating disc 53 further comprising a plurality of first perforations 54, second perforations 55, and third perforations 56, respectively. Each grating disc 50, 52, 53 comprises different shaped, sized, and arranged perforations 54, 55, 56 along a surface area thereof, thereby producing processed foodstuffs 83 having a variety of different textures. Each grating disc 50, 52, 53 comprises a rugged stamped circular stainless steel plate providing a cutting and grinding means to foodstuffs 61 similar thereto a conventional box grater. Said perforations 54, 55, 56 comprise various openings having differing shapes such as circular, oval, slotted, square, and the like, providing sharp stamped edges suitable for cutting and grinding foodstuffs 81 having different textures. Said grating discs 50, 52, 53 comprise a centrally located clamping ring 57 further comprising a cylindrical stainless steel machined part being attached via a flanged base and common fasteners 32 which thread vertically thereinto said grating discs 50, 52, 53. The clamping ring 57 in-turn securely attaches the grating discs 50, 52, 53 thereto the drive shaft 61 as previously described using a common set screw 58.

Figure 5:
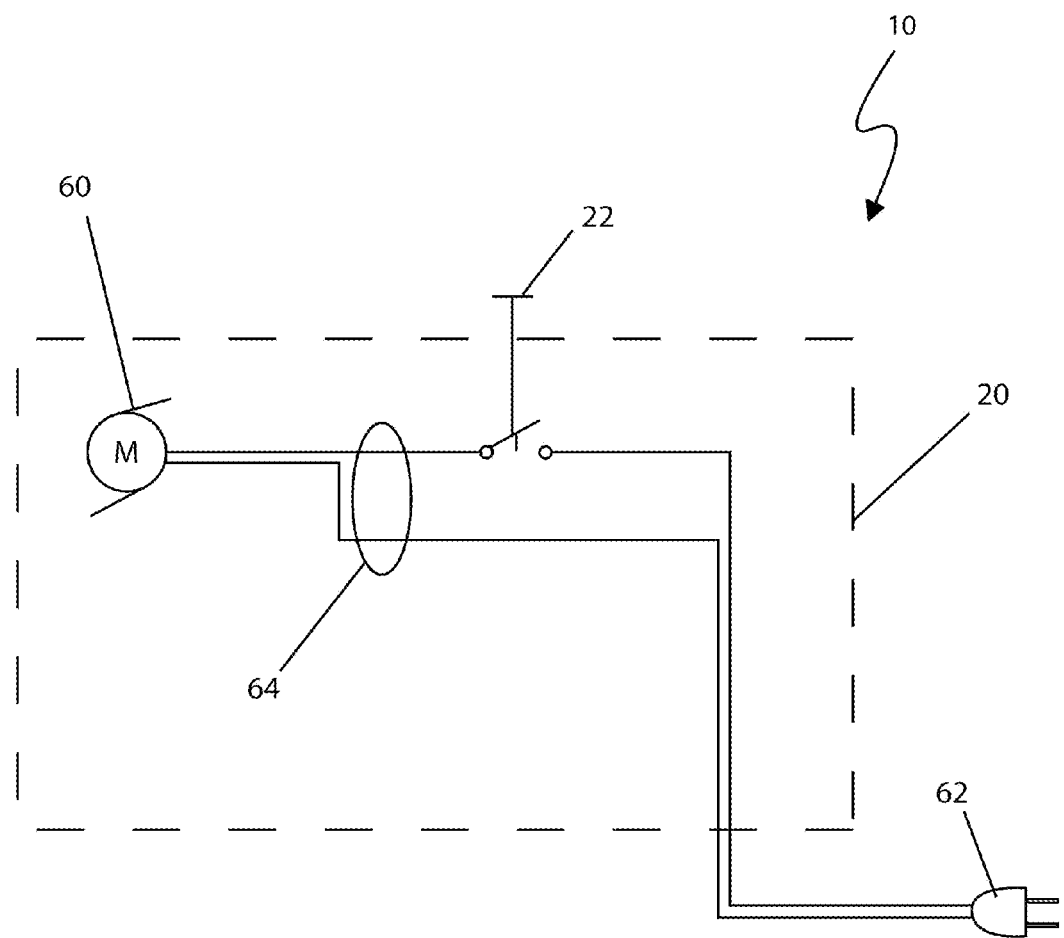

Referring now to FIG. 5, an electrical block diagram of a pasteles maker 10, according to a preferred embodiment of the present invention, is disclosed. A simple AC circuit is depicted here illustrating an AC electrical current provided to the apparatus 10 by a conventional 110-volt power cord 62 which would be inserted therein a normal household electrical outlet in an expected manner. Said current is in-turn conducted therethrough the ON/OFF button switch 22 via internal wiring 64, thereby controlling a flow of electricity thereto the AC motor 60 located within the base unit 20 (see FIG. 2).

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user 80 in a simple and effortless manner with little or no training. After initial purchase or acquisition of the apparatus 10, it would be installed and utilized as indicated in FIG. 1.

The method of installing and utilizing the apparatus 10 may be achieved by performing the following steps: placing the apparatus 10 upon a solid flat work surface such as a kitchen counter, table, or the like; choosing a particular grating disc 50, 52, 53 having desired size/pattern perforations 54, 55, 56; installing said selected grating disc 50, 52, 53 by inserting the drive shaft 61 therethrough the aperture portion 59 of the clamping ring 31 and securing therewith a set screw 58; plugging the AC power cord 62 into the nearest 110-volt household outlet; placing a quantity of foodstuffs 81 thereinto the hopper 30; manually inserting the pressing disc 40 downwardly into the hopper 30 using the knob 41; applying a light downward pressure, thereby producing a pressing motion 82 upon said foodstuffs 81; pressing the "ON" button portion of the ON/OFF button switch 22; maintaining a light downward force thereby forcing said foodstuffs 81 therethrough the perforations 54, 55, 56 of the desired rotating grating disc 50, 52, 53; collecting the processed foodstuffs 83 flowing therefrom the spout 21 thereinto a receiving container 90; continuing said pressing motion 80 until the hopper 30 is empty of foodstuffs 81 or a desired quantity of processed foodstuffs 83 has been obtained; pressing the "OFF" button portion of the ON/OFF button switch 22 to stop the apparatus 10; replenishing the foodstuffs 81 therein the hopper 30, as desired; repeating said food processing procedure until obtaining a desired amount of processed foods 83 or until exhausting a supply of foodstuffs 81; disassembling, washing, and storing the apparatus 10 until needed again; and, benefiting from the quick and efficient cutting, grating, and processing of foodstuffs 61 as required by Latin American food dishes and other recipes, using the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A food preparation apparatus for processing foodstuffs, further comprising:
   a base unit, further comprising:
      a six-sided box structure with an interior defined therewithin;
      four stabilizing foot pads attached to each corner of a bottom surface of said base unit, wherein said foot pads provide a firm lateral grip thereto a support surface, and absorb vibration, reduce noise, and stabilize said apparatus;
      a spout well disposed along a common edge of a front panel and a top panel of said base unit, said spout well indented toward said interior relative to both said front panel and said top panel; and,
      a spout comprising a three-sided chute attached to said top panel such that said spout is centrally positioned on said front panel thereof, further comprising:
         a pair of spout side walls each having a mounting ear horizontally outwardly extending therefrom, said mounting ears removably attachable to said top panel;
         a distal end adjacent to a hopper; and,
         a proximal end at a downwardly and outwardly sloping location from said distal end;
         wherein said processed foodstuffs travels on said spout from said distal end to said proximal end; and,
         wherein a receiver for said processed foodstuffs is located subjacent to said proximal end;
   said hopper mounted thereto said top panel of said base unit, comprising a cylindrical vessel with an open top and a processed food opening above and in fluid communication with said spout;
   a pressing disc for insertion in said hopper for contacting said foodstuffs residing therein;
   a grating disc removably placed in said hopper, comprising a plurality of perforations interspaced about said disc in a radial pattern, each comprising an opening and a sharp edge providing a cutting and grinding means to foodstuffs; and,
   a disc driving means mounted within said interior and routed through said top panel and a bottom portion of said hopper;
   wherein said grating disc is removably coupled to said disc driving means with a clamping ring;
   wherein said disc driving means provides a rotating motion to said grating disc when coupled thereto;
   wherein said pressing disc further comprises a diameter matching that of said grating disc, thereby providing a constant and uniform downward force directing said foodstuffs toward said grating disc; and,
   wherein said grating disc produces processed foodstuffs which are directed to said spout.

2. The apparatus of claim 1, wherein said footpads comprise cylinder-shaped rubber devices.

3. The apparatus of claim 1, wherein said spout further comprises a width of approximately five to seven inches wide with said distal end sloping downwardly at approximately a thirty degree angle to said proximal end.

4. The apparatus of claim 3, wherein said spout comprises a polished heavy-gauge stainless steel sheet.

5. The apparatus of claim 1, wherein said base unit comprises a resilient plastic molded construction.

6. The apparatus of claim 1, wherein said base unit comprises a stainless steel assembly of affixed individual panels.

7. The apparatus of claim 1, wherein said hopper comprises a transparent material for visually identifying a type and amount of foodstuffs therewithin and further comprising:
   a pair of opposing "U"-shaped handles located on an outer surface;
   a reinforced circular upper rim; and,
   said processed food opening comprising a circular segment of a bottom portion of said hopper;
   wherein said processed food opening enables a sufficient flow of processed foodstuffs from said apparatus.

8. The apparatus of claim 7, wherein said processed food opening comprises a width of approximately four inches.

9. The apparatus of claim 1, wherein said pressing disc further comprises:
   a transparent plastic circular plate; and,
   a knob at a central location of an upper surface of said plate;
   wherein said pressing disc comprises a corresponding diameter so as to slidingly fit into said open top of said hopper.

10. The apparatus of claim 9, wherein said pressing disc comprises a thickness of approximately one-quarter (¼) of an inch.

11. The apparatus of claim 1, wherein said grating disc further comprises:
   a circular stainless steel plate; and,
   said clamping ring centrally located about a central aperture of said plate and attached via a flanged base and common fasteners vertically threaded into said grating disc;
   wherein said clamping ring securely attaches said grating disc to said disc driving means with a set screw.

12. The apparatus of claim 11, wherein said plurality of perforations comprise a geometric shape suitable for different foodstuffs comprising different textures.

13. The apparatus of claim 1, wherein said disc driving means further comprises:
   a motor mounted in a vertical configuration at a central location along an inner bottom panel surface within said interior of said base unit with a mounting plate;
   a drive shaft vertically extending from a top portion thereof and driven thereby said motor into said hopper;
   an ON/OFF power switch in electrical communication with said motor via internal wiring and located on a front panel of said base unit; and,
   a power cord in electrical communication with said ON/OFF power switch, thereby providing power from a power source to said apparatus;
   wherein said drive shaft provides a removably attachment means to said grating disc with said clamping ring;

wherein said ON/OFF power switch provides a controlling flow of electricity to said motor;

wherein said motor drives said drive shaft, which in turn rotatably drives said grating disc; and, wherein said motor comprises a torque and output revolutions to provide an adequate means for processing said foodstuffs.

14. The apparatus of claim 13, wherein said motor further comprises a 110-volt AC unit with an approximate one-half (½) horsepower rating and comprises a standard gear-type motor unit having internal gear reduction components.

15. The apparatus of claim 1, wherein said hopper comprises LEXAN™, acrylic, or PLEXIGLAS™, and wherein said base unit comprises polypropylene or acrylonitrile butadiene styrene.

16. A food preparation apparatus for processing foodstuffs, further comprising:

a base unit, comprising a six-sided box structure with an interior defined within and further comprising:

four stabilizing foot pads attached to each corner of a bottom surface of said base unit;

a spout well disposed along a common edge of a front panel and a top panel of said base unit, said spout well indented toward said interior relative to both said front panel and said top panel; and, a spout comprising a three-sided chute in fluid communication with a hopper having a pair of mounting ears horizontally outwardly extending from opposing side walls attached to said top panel of said base unit such that said spout is centrally positioned on said front panel thereof, further comprising a distal end adjacent to said hopper and a proximal end at a downwardly and outwardly sloping location from said distal end;

said hopper mounted to said top panel of said base unit, further comprising:

a transparent cylindrical vessel with an open top and a processed food opening above said spout;

a pair of opposing "U"-shaped handles located on an outer surface;

a reinforced circular upper rim; and, a processed food opening comprising a circular segment of a bottom portion of said hopper;

a transparent pressing disc for insertion in said hopper for contacting said foodstuffs residing therein, comprising a knob at a central location and a diameter so as to slidingly fit into aid open top of said hopper;

a grating disc removably placed in said hopper, further comprising:

a circular stainless steel plate;

a plurality of perforations interspaced about said plate in a radial pattern, each comprising an opening and a sharp edge providing a cutting and grinding means to said foodstuffs; and, a clamping ring centrally located about a central aperture of said plate and attached via a flanged base and common fasteners vertically threaded into said grating disc; and, a disc driving means mounted within said interior and routed through said top panel and said bottom portion of said hopper, further comprising:

a motor mounted in a vertical configuration at a central location along an inner bottom panel surface within said interior of said base unit with a mounting plate;

a drive shaft vertically extending from a top portion thereof and driven thereby said motor into said hopper;

an ON/OFF power switch in electrical communication with said motor via internal wiring and located on a front panel of said base unit; and, a power cord in electrical communication with said ON/OFF power switch, thereby providing power from a power source to said apparatus;

wherein said base unit provides a stabilizing means to said apparatus;

wherein said grating disc is removably coupled to said disc driving means with said clamping ring;

wherein said disc driving means provides a rotating motion to said grating disc when coupled thereto;

wherein said pressing disc further comprises a diameter matching that of said grating disc, thereby providing a downward force, directing said foodstuffs toward said grating disc; and, wherein said grating disc produces processed foodstuffs which are directed to said spout.

17. The apparatus of claim 16, wherein said base unit comprises a resilient plastic molded construction or a stainless steel assembly of affixed individual panels.

18. The apparatus of claim 16, wherein said plurality of perforations comprise a geometric shape suitable for different foodstuffs comprising different textures.

19. The apparatus of claim 16, wherein said hopper comprises LEXAN™, acrylic, or PLEXIGLAS™, and wherein said base unit comprises polypropylene or acrylonitrile butadiene styrene.

20. A method of preparing processed foodstuffs comprising the following steps:

providing a foodstuffs preparation apparatus, comprising:

a food preparation apparatus for processing foodstuffs, further comprising:

a base unit, comprising a six-sided box structure with an interior defined within and further comprising:

four stabilizing foot pads attached to each corner of a bottom surface of said base unit;

a spout well disposed along a common edge of a front panel and a top panel of said base unit, said spout well indented toward said interior relative to both said front panel and said top panel; and, a spout comprising a three-sided chute in fluid communication with a hopper having a pair of mounting ears horizontally outwardly extending from opposing side walls attached to said top panel of said base unit such that said spout is centrally positioned on said front panel thereof, further comprising a distal end adjacent to said hopper and a proximal end at a downwardly and outwardly sloping location from said distal end;

said hopper mounted thereto said top panel of said base unit, further comprising:

a transparent cylindrical vessel with an open top and a processed food opening above said spout;

a pair of opposing "U"-shaped handles located on an outer surface;

a reinforced circular upper rim; and, a processed food opening comprising a circular segment of a bottom portion of said hopper;

a transparent pressing disc for insertion in said hopper for contacting said foodstuffs residing therein, comprising a knob at a central location and a specific diameter so as to slidingly fit into said open top of said hopper;

a grating disc removably placed in said hopper, further comprising:

a circular stainless steel plate;

a plurality of perforations located on said plate, each comprising a common geometric opening and a sharp edge providing a cutting and grinding means to said foodstuffs; and,
a clamping ring centrally located about a central aperture of said plate and attached via a flanged base and common fasteners vertically threaded into said grating disc; and,
a disc driving means mounted within said interior and routed through said top panel and said bottom portion of said hopper, further comprising:
a motor mounted in a vertical configuration at a central location along an inner bottom panel surface within said interior of said base unit with a mounting plate;
a drive shaft vertically extending from a top portion thereof and driven thereby said motor into said hopper;
an ON/OFF power switch in electrical communication with said motor via internal wiring and located on a front panel of said base unit; and,
a power cord in electrical communication with said ON/OFF power switch, thereby providing power from a power source to said apparatus;
placing said apparatus upon a solid flat work surface;
choosing a desired grating disc having a desired size and pattern of said plurality of perforations;
installing said desired grating disc by inserting said drive shaft through said central aperture of said clamping ring and securing with a set screw;
providing power from said power source to said apparatus through said power cord;
placing a quantity of foodstuffs into said hopper;
manually inserting said pressing disc downwardly into said hopper using said knob;
applying a light downward pressure, thereby producing a pressing motion upon said quantity of foodstuffs and a constant and uniform downward force on said foodstuffs directing to said grating disc;
pressing said ON/OFF button to an "ON" position, thereby providing power to said motor which drives said drive shaft to provide a rotating motion to said desired grating disc;
maintaining said pressing motion thereby forcing said foodstuffs through said plurality of perforations of said desired grating disc and producing a desired quantity of processed foodstuffs;
collecting said desired quantity of processed foodstuffs flowing from said spout into a receiving container placed directly subjacent thereto;
continuing said pressing motion until said hopper is empty of said quantity of foodstuffs or said desired quantity of processed foodstuffs has been obtained;
pressing said ON/OFF button to an "OFF" position thereby eliminating power to said apparatus, thereby stopping said motor, said drive shaft, and said rotating motion of said desired grating disc;
replenishing said foodstuffs in said hopper, as desired;
repeating said previous procedure until obtaining said desired amount of processed foods or until exhausting a supply of foodstuffs; and,
disassembling, washing, and storing said apparatus until a subsequent use.

* * * * *